Patented Nov. 5, 1935

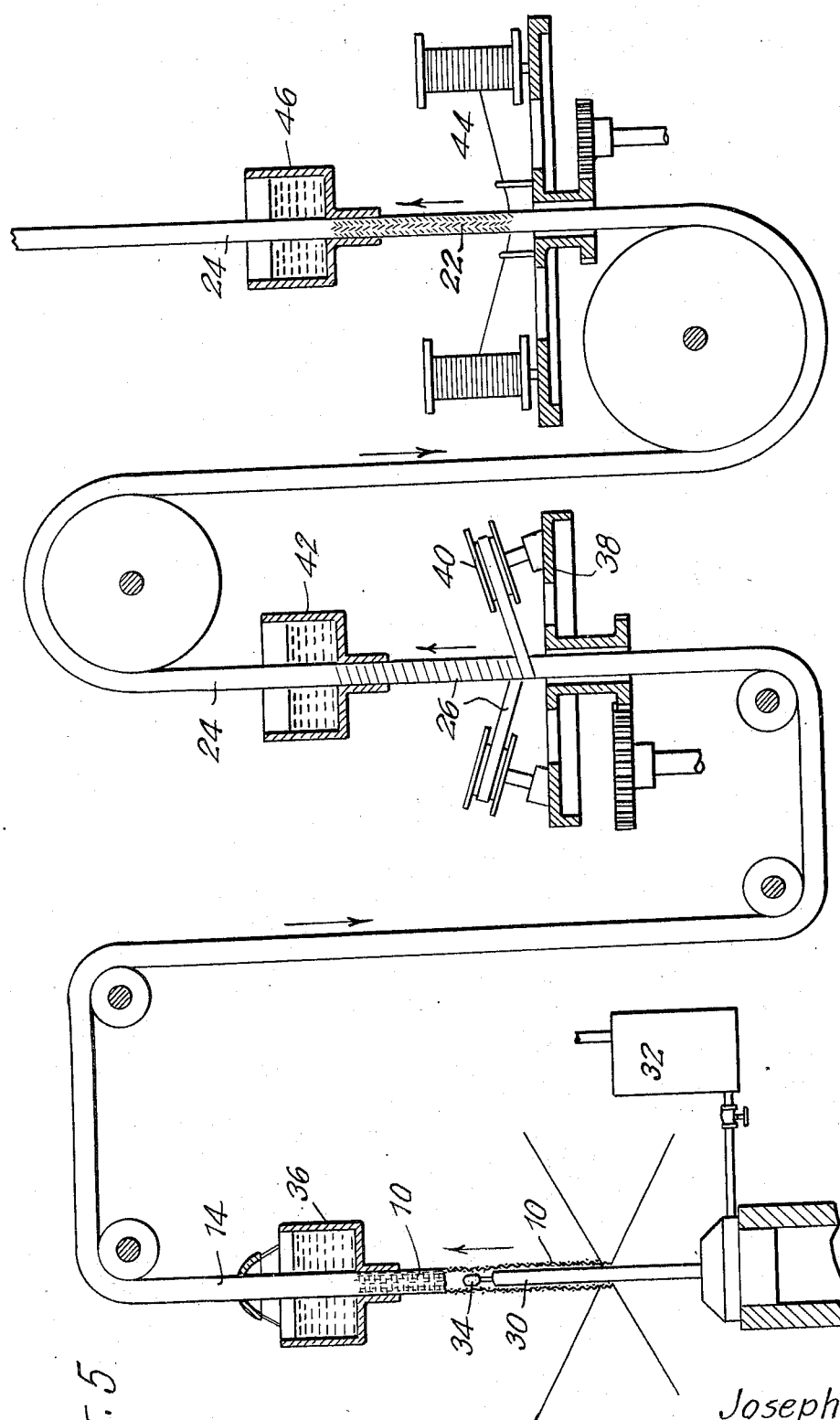

2,019,709

UNITED STATES PATENT OFFICE 2,019,709

METHOD OF MAKING LATEX TREATED TUBING

Joseph A. Kennedy, Pawtucket, R. I., assignor to Anaconda Wire & Cable Company, New York, N. Y., a corporation of Delaware Application January 22, 1932, Serial No. 588,157

3 Claims. (Cl. 154—8)

This invention relates to improvements in nonmetallic tubing, the particular feature of novelty residing in forming extremely flexible hose or tubing with several plies of woven or braided tubes with coatings of unmasticated rubber or synthetic rubber applied in the form of latex, or an aqueous dispersion of rubber-like material to the inner raceway of the tube, as well as between the plies of a woven or braided tubing. An important feature of the invention resides in the incorporation of one or more thin layers of rubber in the form of latex in the tube structure, so as to provide rubber-like films of great purity and to produce a tube of great flexibility and long useful life. The above and other features of the invention will be fully apparent from the following specification when read in connection with the accompanying drawings and will be pointed out with particularity in the appended claims. In the drawings—

Fig. 5 is a diagram illustrating apparatus for carrying out my method.

An important feature of the invention resides in incorporating in the tube structure one or more layers of extremely pure unmasticated rubber or synthetic rubber. The unmasticated rubber, which is incorporated in my improved tubing is of extreme purity because it has not been contaminated by the incorporation of foreign matter. The usual forms of masticated rubber heretofore used include impurities which become intermixed at the time the crude rubber is prepared. The usual mastication is considered necessary to remove these impurities in part. Such mastication breaks the fiber structure to a certain extent. The unmasticated rubber, which I incorporate in my tube structure is thought to endow the latter with longer life, greater flexibility and elasticity without rupture or breakage, while at the same time utilizing a relatively thinner layer than that required when ordinary rubber is to be used. This effects important manufacturing economies.

The rubber or rubber-like layers incorporated in my improved tube structure may be applied in the form of latex including the usual preservatives, accelerators, fillers and the like. The latex will usually be applied in the form of an aqueous dispersion of latex or rubber, either vulcanized, or unvulcanized. Unvulcanized latex is preferable in some cases and when used the latex layers, or films, hereinafter referred to, will be self-curing. The application of latex in liquid or semi-liquid form to tubing enables me to incorporate in the tube structure an unmasticated body of rubber or rubber-like material of great purity and long life.

Figure 1:
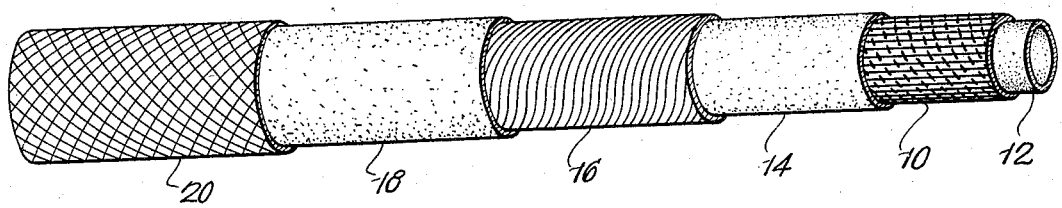
Fig. 1 is a view of a piece of tubing embodying the invention, certain layers thereof being broken away to reveal the structural assembly of the tube.

In the simplest form of the invention, I will provide an innermost woven tube, such as indicated at 10 in Fig. 1. This tube may be formed of longitudinal cotton warp strands and interwoven woof strands formed of twisted paper. An aqueous dispersion of latex will be either sprayed on the interior of the tube, or extruded from a mandrel over which the tube is woven. This will form the innermost impervious layer, indicated at 12. After this layer becomes self-cured, it will form an impervious film of unmasticated rubber. This rubber will extend between the interstices of the cotton warp and helical twisted paper strands and another layer of rubber-like material, as indicated at 14, will be applied and bonded thereto also in the form of an aqueous dispersion of latex or its equivalent. The latter layer may be applied by spraying, or, alternatively, by passing the tube through a bath of latex.

In some cases, there will be applied a serving of yarn, as indicated at 16. And over this, will be applied another coating of latex, or other liquid compound capable of forming a synthetic rubber, either by spraying, or otherwise, thus forming the layer 18 of rubber, or synthetic rubber. Over this, there is applied a braid 20 treated either with latex, or a protective coating of lacquer.

Figure 2:
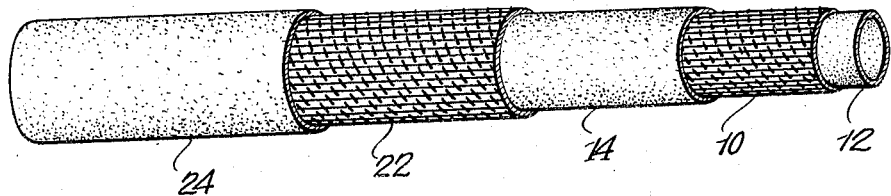

In the embodiment shown in Fig. 2 the inner tube 10 and the layer 14 are substantially the same as described in connection with Fig. 1, but over the layer or film 14, there is a woven or braided cover of suitable cotton or yarn, indicated at 22. This in turn is covered or impregnated with an aqueous dispersion of latex, forming a relatively thin rubber-like layer 24.

Figure 3:
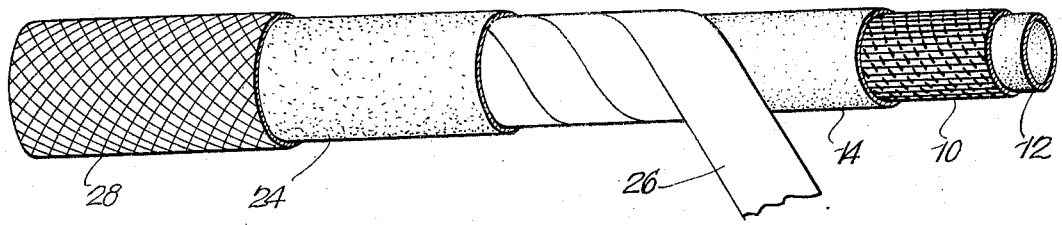
Figs. 2, 3 and 4 are views illustrating alternative embodiments of the invention.

In the modification of Fig. 3, the innermost tube 10 has an inner raceway treated either with latex, as above, or alternatively with asphalt, or an oxidizing varnish. Over the tube 10, there is a layer 14 formed by applying latex, as above described. This layer 14 is covered with a wrapping of tape 26 formed of either paper, or cotton. The tape layer has a coating 28 formed by applying latex thereto and the outer coat is in the form of a braided or woven jacket 28 treated with latex, asphalt, paint, varnish, or lacquer.

Figure 4:
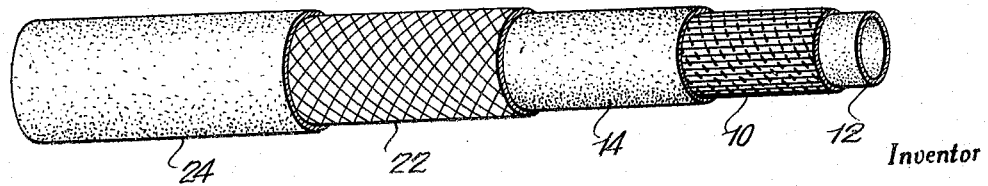

In the embodiment of the invention illustrated in Fig. 4, the inner woven tube 10, the covering 14 and the woven or braided jacket 22 are substantially the same as illustrated and described in connection with Fig. 2, the interior raceway of the tube 10, however, in this instance being treated with lacquer instead of latex and the exterior of the jacket 22 being treated with either latex, lacquer, or suitable asphalt, or varnish protective coating.

In my improved method of manufacturing tubular products, the latex can be applied by spraying on the interior raceway surface of the innermost tube, or the relatively liquid latex can be flowed on by extruding the same from the interior of a spindle over which the innermost tube 10 is woven. The other latex layers, such as indicated at 14 and 18 in Fig. 1 and at 14 and 24 in Fig. 2, at 14 and 28 in Fig. 3 and at 14 and 24 in Fig. 4 are preferably applied by spraying the material over the underlying structures. Or, instead of spraying, in some cases, the tubing may be merely run through a bath of relatively liquid latex.

The latex incorporated in the tube structure, when dried by exposure to air, is self-curing and in the completed tube it forms a thin homogeneous elastic unmasticated rubber-like layer, or coating, which is impervious to oil, water, air, etc. This material, when applied by spraying, or by immersing the article in a liquid bath, forms a thin relatively pure rubber-like film, which is tough and elastic. The latex, when applied over a tube formed of cotton warp and twisted paper woof or filling strands increases the flexibility of the tube. While I have specifically referred to latex, it is to be understood that other self-curing materials capable of forming an impervious flexible coating may be substituted therefor without departure from the invention.

In some cases, the woven tube 10 instead of being composed of cotton warp strands and twisted paper helical woof strands, may be formed of cotton warps and cotton woofs, or jute warp and jute woofs, or paper warp and paper woofs. Also, the tube may consist of cotton warp strands and hemp or jute helical woof strands. The jute may be impregnated thoroughly with asphalt and the inner raceway may have a coating of latex applied thereto, as above described, for water-proofing purposes. The outer surface of the tube may be treated with stearin pitch, over which may be applied an outer coating of latex in order to provide a flexible, elastic, outer water-proofing coating. I also contemplate, in some cases, to include in the tubing assemblies the use of gums, asphalts, pitches and silicates, as intermediate films between the rubber-like coatings which are applied in the form of latex.

Suitable apparatus for carrying out certain steps of my method is disclosed in my copending application Serial No. 667,190, filed April 21, 1933, now Patent 1,949,476 issued March 6, 1934.

This apparatus, as diagrammatically shown in Fig. 5, includes a hollow mandrel 30 about which the warp and filling strands are woven. Rubber latex from a tank 32 is forced from the open end of the mandrel and a floatingly supported member 34 serves to evenly distribute the latex over the inner raceway. Latex is also applied to the outer surface of the woven tube by its passage through a container 36 containing a bath of such latex. The latex thus applied to inner and outer surfaces of the woven tube saturates the strands and also permeates between the interstices thereof and thus homogeneously unites the inner and outer latex layers.

The yarn 16 of Fig. 1 or the tape 26 of cotton or paper wrapping of Fig. 3 is applied by feeding the tube through the flier 38 of a standard taping or wrapping machine which flier carries supply reels 40 of tape or yarn.

The thus wrapped tube is then exteriorly coated with latex by being passed through a bath held in a container 42. Or the latex may be sprayed on from suitable nozzles.

A braided jacket may then be applied by the standard braiding machine 44. And this jacket can be impregnated with latex by being passed through a bath 46.

While I have described quite precisely certain specific features of the embodiments of the invention herein illustrated and have referred to definite steps in its mode of manufacture, it is to be understood that various modifications in the structure and its method of production may be made by those skilled in the art without departing from the invention as defined in the appended claims.

What I claim is:—

1. In the manufacture of tubing, the method which includes providing an inner tube of interconnected flexible strands, spraying an impervious layer over the inner raceway of said tube, spraying a watery dispersion of latex over the exterior of said inner tube and applying a protective covering over said outer latex coating.

2. In the manufacture of flexible tubing, the method which consists in providing a flexible inner tube of interconnected fabric strands, spraying a watery dispersion of self-curing latex over the inner raceway and outer surface of said tubing, and applying to the thus treated tube a fabric coating, and applying a film of self-curing latex to said covering.

3. In the manufacture of tubing, the method which includes providing an inner tube of interconnected cotton and twisted paper strands, applying an impervious film to the inner raceway of said inner tube, enveloping said inner tube in a film of self-curing latex, applying a paper wrapping over the latter, enveloping said wrapping with a thin film of self-curing latex which is the residue of an aqueous dispersion of latex and applying a braided jacket over the last mentioned film and treating said jacket with an elastic protective substance such as self-curing latex, or the like.

JOSEPH A. KENNEDY.